US011015424B2

(12) United States Patent
Samuel et al.

(10) Patent No.: US 11,015,424 B2
(45) Date of Patent: May 25, 2021

(54) GEOSTEERING BASED ON AUTOMATED WELL PERFORMANCE PREDICTION

(71) Applicant: Landmark Graphics Corporation, Houston, TX (US)

(72) Inventors: Robello Samuel, Cypress, TX (US); Umesh N. Reddy, Houston, TX (US); Krishna Chaitanya Nunna, College Station, TX (US); Paola Alejandra Perez Pena, College Station, TX (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 560 days.

(21) Appl. No.: 15/779,496

(22) PCT Filed: Dec. 30, 2015

(86) PCT No.: PCT/US2015/068068
§ 371 (c)(1),
(2) Date: May 25, 2018

(87) PCT Pub. No.: WO2017/116436
PCT Pub. Date: Jul. 6, 2017

(65) Prior Publication Data
US 2018/0334896 A1 Nov. 22, 2018

(51) Int. Cl.
*G06G 7/48* (2006.01)
*E21B 44/00* (2006.01)
(Continued)

(52) U.S. Cl.
CPC ............ *E21B 44/00* (2013.01); *E21B 7/04* (2013.01); *E21B 47/024* (2013.01);
(Continued)

(58) Field of Classification Search
CPC ......... G05B 19/042; E21B 44/00; E21B 7/04; E21B 47/024; E21B 49/003
(Continued)

(56) References Cited

U.S. PATENT DOCUMENTS 8,210,283 B1 7/2012 Benson et al.
2010/0185395 A1 7/2010 Pirovolou et al.
(Continued)

FOREIGN PATENT DOCUMENTS

WO WO-2014123640 A1 8/2014
WO WO 2014/160741 A1 10/2014

OTHER PUBLICATIONS

Search Report issued for European Patent Application No. 15912188.8, dated Aug. 1, 2019, 8 pages.
(Continued)

*Primary Examiner* — Andre Pierre Louis

(57) ABSTRACT

Systems and methods for automated planning and/or control of a drilling operation are implemented to be based at least in part on automated prediction of well performance using an analytical well performance model. Substantially real-time determination of one or more drilling parameters and/or well trajectory parameters is based on measurements received from a drill tool together with the well performance model. The described techniques thus provide for automated, analytically determined well performance measures (e.g., well productivity and/or revenue) to a geosteering process. The well performance model accounts for variations of well trajectory both in inclination and in azimuth angle.

18 Claims, 7 Drawing Sheets

(51) Int. Cl.
  *E21B 47/024* (2006.01)
  *E21B 7/04* (2006.01)
  *G05B 19/042* (2006.01)
  *E21B 49/00* (2006.01)

(52) U.S. Cl.
  CPC .......... *E21B 49/003* (2013.01); *G05B 19/042* (2013.01); *G05B 2219/45129* (2013.01)

(58) Field of Classification Search
  USPC ...................................................... 703/9, 10
  See application file for complete search history.

(56) References Cited

U.S. PATENT DOCUMENTS

| | | | |
|---|---|---|---|
| 2010/0282508 A1 | 11/2010 | Johnston et al. | |
| 2012/0016649 A1 | 1/2012 | Thambynayagam et al. | |
| 2012/0046868 A1 | 2/2012 | Tchakarov et al. | |
| 2013/0032401 A1* | 2/2013 | Edbury | E21B 37/00 175/24 |
| 2013/0140037 A1 | 6/2013 | Sequeira, Jr. et al. | |
| 2016/0362937 A1* | 12/2016 | Dyer | E21B 44/00 |

OTHER PUBLICATIONS

Canadian Intellectual Property Office, Application No. 3,005,827, Examiner's Letter, Jun. 4, 2019, 4 pages, Canada.
Korean Intellectual Property Office, PCT/US2015/068068, International Search Report and Written Opinion, dated Sep. 30, 2016, 16 pages, Korea.

* cited by examiner

GEOSTEERING BASED ON AUTOMATED WELL PERFORMANCE PREDICTION

CROSS-REFERENCE TO RELATED APPLICATIONS

This application is a U.S. national stage patent application of International Patent Application No. PCT/US2015/068068, filed on Dec. 30, 2015, the benefit of which is claimed and the disclosure of which is incorporated herein by reference in its entirety.

BACKGROUND

Wellbores are formed in subterranean formations for various purposes including, for example, the extraction of oil and natural gas. Such wellbores are typically formed using a drill string having at its downhole end a bottomhole assembly (BHA) that includes a drill bit. A well path or trajectory to be followed by the drill bit through the formation is typically planned based on survey measurements that indicate formation structure and properties. Such drilling operations often provide for geosteering of the BHA based on the planned well path. Automated geosteering and/or provision of geosteering decision information to an operator is in some instances also based on substantially real-time measurement of formation properties in a logging while drilling (LWD) operation performed using measurement tools forming part of the BHA.

Current geosteering techniques typically provide for wellbore planning or drilling parameter calculation based on geoscience constraints and/or on optimization of one or more drilling performance measures, such as rate of penetration, specific energy, well smoothness, and the like.

BRIEF DESCRIPTION OF THE DRAWINGS

Some embodiments are illustrated by way of example and not limitation in the figures of the accompanying drawings in which.

DETAILED DESCRIPTION

Figure 1:
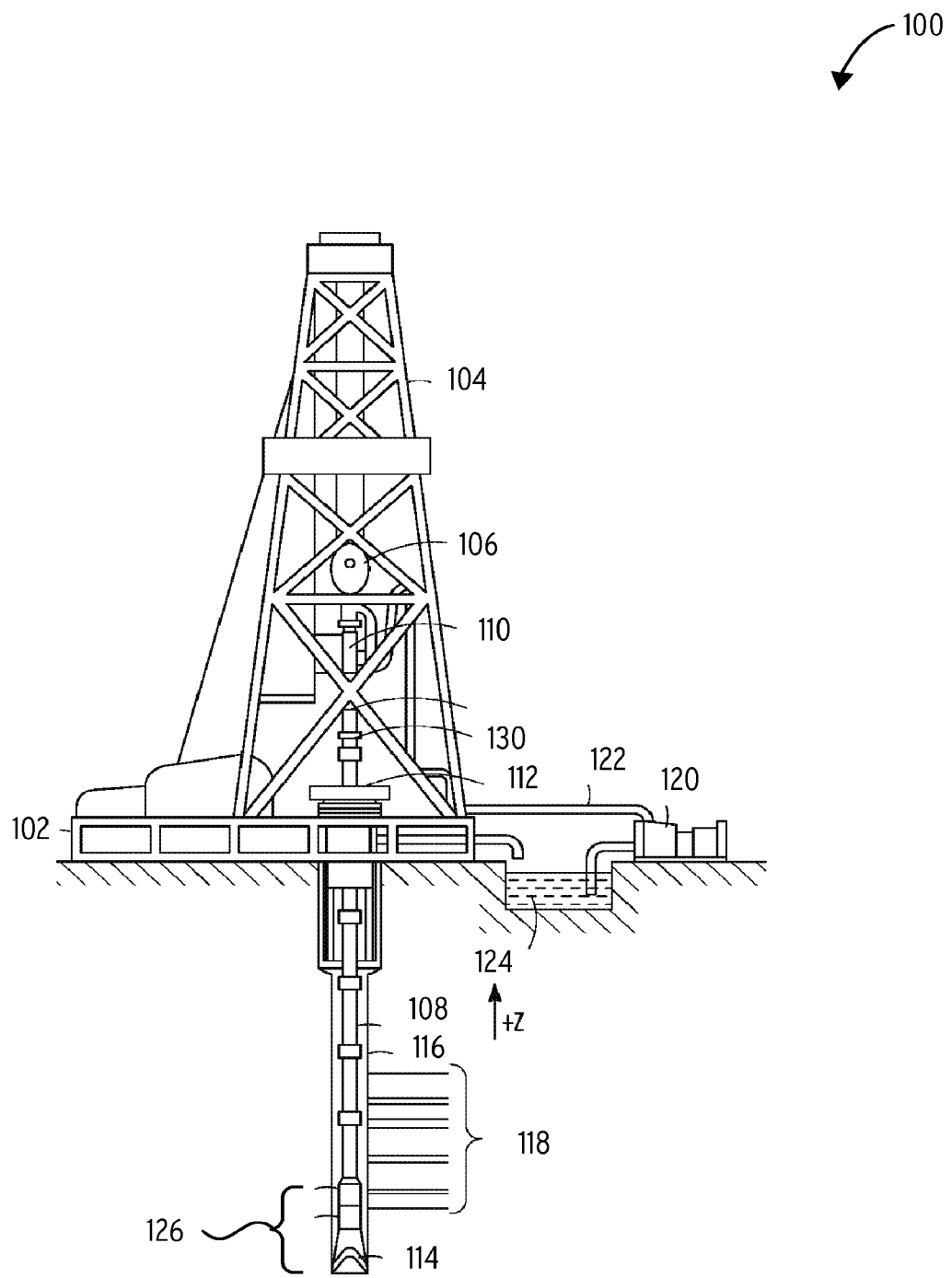
FIG. 1 depicts a schematic view of a drilling installation that includes a drill string configured for automated operational well planning and/or control based at least in part on well performance modeling, according to an example embodiment.

One aspect of the disclosure provides for a system and method for automated planning and/or control of the drilling operation based on automated prediction of well performance using an analytical well performance model. Some embodiments provide for substantially real-time determination of one or more drilling parameters and/or well trajectory parameters based on measurements received from a drill tool with which a drilling operation is performed. The parameters thus calculated may then be used for geosteering of the drill tool, in some embodiments by automated control of a drill tool steering. Instead, or in addition, geosteering of the tool is in some embodiments enabled by displaying geosteering guidance information to an operator based on the automated well performance prediction.

These aspects of the disclosure thus provide for automated, analytically determined well performance measures (e.g., well productivity and/or revenue) to the geosteering process. Accurate and cumulative prediction of productivity of the potential formation according to the disclosed techniques may be employed for well planning, completion and/or production optimization.

In some embodiments, the methods and systems provide for predicting performance of a well on a real-time basis based on different well trajectories and their respective placement relative to the reservoir. In some embodiments, for example, the predicted productivity of the actual well trajectory is compared with the predicted productivity of a planned well trajectory. Geosteering information representative of the comparative predicted productivities may in some embodiments be displayed on a graphic user interface on the fly, to provide a graphical and/or numerical indication to a drilling engineer about predicted final performance of the well.

The well performance model in some embodiments expresses a wellbore production measure such that a predicted value of the wellbore production measure is dependent on the trajectory of a particular wellbore or wellbore segment modeled using the well performance model. In some embodiments, the well performance model is a three-dimensional model that accounts for wellbore trajectory variations in any direction. The well performance model may be sensitive not only to variations in three-dimensional position of a wellbore segment under consideration, but may additionally be sensitive to any variation in orientation of such a wellbore segment. In some embodiments, in other words, the well performance model accounts for variations both in inclination and in azimuth angle of a wellbore or a wellbore segment under consideration.

In some embodiments, the well performance model is based on a continuous line source solution. Well performance prediction may in such embodiments be performed for complex trajectories, such as those typically generated by geosteering, by using superposition in space. In such embodiments, the well trajectory is segmented and then simplified by modeling the well trajectory as a series of straight-line segments. A respective predicted production value (e.g., productivity index or revenue) may then be automatically predicted for each segment based on the well performance model, the predicted value for each segment being sensitive to inclination and/or azimuthal orientation of the straight line by which it is modeled, as well as being sensitive to the position of the straight line relative to estimated reservoir boundaries.

In some embodiments, automated calculation of the production value for a respective trajectory segment comprises approximating the formation or reservoir within which the segment lies as a homogenous box reservoir. The boundaries of the box reservoir may be estimated based at least in part on log data or geological survey data, and the position of the trajectory segment relative to the box boundaries may be estimated based at least in part on logging while drilling (LWD) and/or a measuring while drilling (MWD) data gathered by the drill tool with which the drilling operation is performed.

In some embodiments, the well performance model assumes constant uniform flow within each box reservoir. In other words, no predetermined flow pattern is assumed by the well performance model in such cases. The well performance model may in some embodiments define each homogenous box reservoir as having no-flow boundaries. In some embodiments, the well performance model assumes constant uniform flow within each box reservoir.

In some embodiments automated calculation based on the well performance model is used to calculate a performance index for a well segment and/or for an entire productive portion of a wellbore. Instead, or in addition, automated calculation based on the well performance model may include predicting a financial performance measure, such as revenue generated by the well or well portion, and/or a net present value of the well.

In some embodiments, the method includes determining a target trajectory for a wellbore based at least in part on an automated optimization operation to maximize the production measure expressed by the well performance model. Such optimization may comprise predicting respective production measure values for a number of different well trajectories.

In some embodiments, automated well planning and/or geosteering control/assistance may be based not only on automated well performance prediction, but may in addition be based at least in part on automated drilling efficiency determination using an analytical model that expresses a drilling efficiency measure as dependent on one or more wellbore trajectory attributes. In some embodiments, the drilling efficiency measure may include a well profile energy index or a drilling difficulty index calculated for different respective wellbore trajectories. The well profile energy index may, for example, be indicative of wellbore smoothness or curvature.

The method may in such cases provide for well path optimization based both on predicted wellbore production values and corresponding drilling efficiency values. In one embodiment, such values may be calculated for different candidate wellbore trajectories. Decision data representative of the different values for these measures may in some embodiments be displayed on a graphical user interface to assist or enable operator-controlled geosteering based on the wellbore production measure and/or based on the drilling efficiency measure.

The disclosed methods and procedures are in some embodiments implemented in a plug-in program, which may be used for automatic wellbore steering and production optimization. As a well is drilled, the well often gets undulated due to steering in a rotary and steerable mode. This may result in a well path that is either not aligned with a planned well path or with a sweet spot corresponding with maximum production. A benefit of the disclosed methods and systems is that it promotes placement of the well in or close to the sweet spot, thus optimizing or at least increasing production of the resultant well. Automated wellbore performance calculation in accordance with the disclosure may be performed during planning and/or during drilling. The described techniques may, in addition, be performed in real-time mode and/or in static mode.

Drilling operations based at least in part on automated well performance calculation in accordance with the example embodiments may be particularly beneficial for drilling long horizontal wells, for formations where there is geological uncertainty, for drilling in thin reservoirs, and for drilling in laminated reservoirs. Note, however, that three-dimensionality of the well performance model allows for application of these techniques to wells of any shape or orientation and in formations of any type.

Automated well performance prediction or estimation may be performed using historical data and/or drillahead data indicating one or more formation property metrics. Instead, or in addition, well performance calculation may be performed using a static earth model or using an updated real-time earth model.

Instead, or in addition, the automated well performance determination may in some embodiments be performed based on specialized tools data, which may be gathered while drilling. In some embodiments, such specialized tool data may be provided by tools with multi-spacing resistivity measurements for petrophysical evaluation of the reservoir. Instead, or in addition, log data used for well production determination may in some embodiments be captured using tools to measure deep-reading sensitivity to approaching bed boundaries from the wellbore, thus allowing for proactive, rather than reactive geosteering to keep the well in a target zone.

The following detailed description describes example embodiments of the disclosure with reference to the accompanying drawings, which depict various details of examples that show how various aspects of the disclosure may be practiced. The discussion addresses various examples of novel methods, systems, devices and apparatuses in reference to these drawings, and describes the depicted embodiments in sufficient detail to enable those skilled in the art to practice the disclosed subject matter. Many embodiments other than the illustrative examples discussed herein may be used to practice these techniques. Structural and operational changes in addition to the alternatives specifically discussed herein may be made without departing from the scope of this disclosure.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, as well as all legal equivalents of such claims.

FIG. 1 is a schematic illustration of an example drilling system 100 that embodies techniques consistent with this disclosure in a logging while drilling (LWD) environment, and in which geosteering is performed substantially in real-time based on well performance modeling. A drilling platform 102 is equipped with a derrick 104 that supports a hoist 106 for raising and lowering a drill string 108. The hoist 106 suspends a top drive 110 suitable for rotating the drill string 108 and lowering the drill string 108 through the wellhead 112. Connected to the downhole end of the drill string 108 is a drill bit 114 that forms part of a bottom hole assembly (BHA 126). As the bit 114 rotates, it creates a wellbore 116 that passes through a formation 118 containing hydrocarbons that are to be extracted via the wellbore 116. A pump 120 circulates drilling fluid through a supply pipe 122 to top drive 110, down through the interior of the drill string 108, through orifices in bit 114, back to the surface via an annulus around drill string 108, and into a retention pit 124. The drilling fluid transports cuttings from the wellbore 116 into the pit 124 and aids in maintaining the integrity of the wellbore 116. Various materials can be used for drilling fluid, including a salt-water based conductive mud.

Although the drilling system 100 is shown and described in FIG. 1 with respect to a rotary drill system, it will be appreciated that many types of drilling systems can be employed in carrying out embodiments consistent with the disclosure. For instance, drills and drill rigs may in some embodiments be used onshore (as depicted in FIG. 1) or offshore (not shown). Offshore oil rigs that may be used in accordance with embodiments of the disclosure include, for example, floaters, fixed platforms, gravity-based structures, drill ships, semisubmersible platforms, jack-up drilling rigs, tension-leg platforms, and the like.

Note that although the wellbore 116 is schematically shown in FIG. 1 to have a rectilinear vertical trajectory, the wellbore 116 may in different embodiments have different trajectories. The present example embodiment will further be described with reference to a long undulated well that has a productive portion extending more or less horizontally with in a formation 118 in which one or more fluid reservoirs as substantially horizontally extending bed boundaries.

Figure 2:
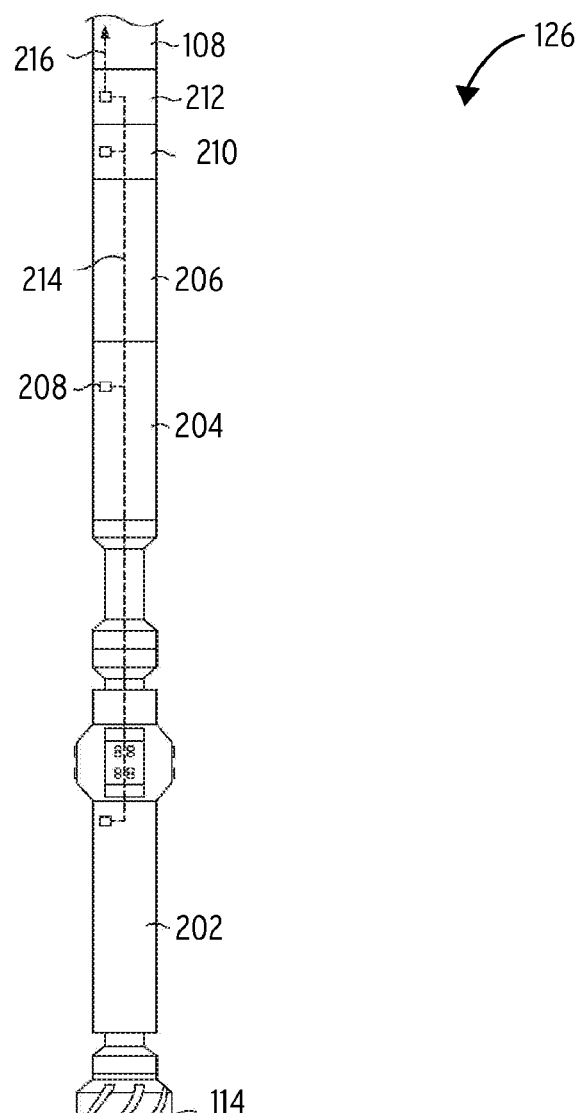
FIG. 2 depicts a schematic side view of a bottomhole assembly, according to an example embodiment.

Referring now to FIG. 2, with continued reference to FIG. 1, illustrated is an exemplary BHA 126 that can be used in accordance with one or more embodiments of the present disclosure. As illustrated, the BHA 126 may include at least the drill bit 114, a steering assembly 202 operatively coupled to the drill bit 114, a measuring tool 204, and a drill collar 206.

The steering assembly 202 may be any type of downhole steering system or device configured to orient the drill bit 114 such that a planned trajectory or wellbore path is followed. In some embodiments, the steering assembly 202 may be a rotary steerable tool. In other embodiments, the steering assembly 202 may be a mud motor or any other known device or system that may reorient the trajectory of the drill bit 114, without departing from the scope of the disclosure. Some embodiments may provide for automated optimization and control of drilling parameters (such as weight on bit, rotational bit speed, and fluid flow rate). In some embodiments, the steering assembly 202 is configured for automated geosteering control. Instead, or in addition, the steering assembly 202 may be controlled remotely by a drilling engineer at the surface by use of control systems such as that described below. In such embodiments, the disclosed techniques may be employed using embodiment assembly without a steering assembly.

The measuring tool 204 includes a measuring while drilling (MWD) sensor package that may include one or more survey probes 208 configured to collect and transmit directional information, mechanical information, formation information, and the like. In particular, the one or more survey probes 208 may include one or more internal or external sensors such as, but not limited to, an inclinometer, one or more magnetometers, (i.e., compass units), one or more accelerometers, a shaft position sensor, combinations thereof, and the like. Directional information (i.e., wellbore trajectory in three-dimensional space) of the BHA 126 within the earth (FIG. 1), such as inclination and azimuth, may be obtained in real-time using the survey probes 208.

The measuring tool 204 in this example embodiment further includes a (LWD) sensor package that may include one or more sensors configured to measure formation parameters such as resistivity, porosity, sonic propagation velocity, neutron density, or gamma ray transmissibility. The measuring tool 204 in this example embodiment includes a specialized tool to capture multi-spacing resistivity measurements for petrophysical evaluation of the reservoir. The measuring tool 204 may in some embodiments be configured to measure deep-reading sensitivity to approaching bed boundaries. This allows for proactive, rather than reactive geosteering to keep the well in a target zone.

As the bit 114 extends the wellbore 116 through the formation 118, the measuring tool 204 collects measurements relating to various formation properties, while the MWD sensor package collects measurements relating to tool orientation and various other drilling conditions.

In some embodiments, the MWD and LWD tools, and their related sensor packages, may be in communication with one another to share collected data therebetween. The measuring tool 204 can be battery driven or generator driven, as known in the art, and any measurements obtained from the measuring tool 204 can be processed either at the surface (see, for example, FIG. 7) or at a downhole location.

The drill collar 206 may be configured to add weight to the BHA 126 above the drill bit 114 so that there is sufficient weight on the drill bit 114 to drill through the requisite geological formations. Weight may also be applied to the drill bit 114 through the drill string 108 as extended from the surface.

The BHA 126 may further include a sensor sub 210 coupled to or otherwise forming part of the BHA 126. The sensor sub 210 may be configured to monitor various operational parameters in the downhole environment with respect to the BHA 126. For instance, the sensor sub 210 may be configured to monitor operational parameters of the drill bit 114 such as, but not limited to, weight-on-bit (WOB), torque-on-bit (TOB), rotational speed of the drill bit 114, bending moment of the drill string 108, vibration potentially affecting the bit 114, and the like. In some embodiments, the sensor sub 210 may be a DRILLDOC® tool commercially-available from Sperry Drilling of Houston, Tex., USA. The DRILLDOC® tool, or another similar type of sensor sub 210, may be configured to provide real-time measurements of weight, torque and bending on an adjacent cutting tool (i.e., the drill bit 114) and/or drill string 108 to characterize the transfer of energy from the surface to the cutting tool and/or drill string 108.

The BHA 126 may further include a controller module 212 coupled to or otherwise forming part of the BHA 126. The controller module 212 may be a downhole computer system communicably coupled to each of the sensor sub 210, the measuring tool 204 (e.g., its survey probes 208) and the steering assembly 202 via one or more communication lines 214. Via the communication lines 214, the controller module 212 may be configured to send and receive data and commands to/from the sensor sub 210, the measuring tool 204, and the steering assembly 202 substantially in real time.

In some embodiments, the controller module 212 may further be communicably coupled to the surface (FIG. 1) via one or more communication lines 216 such that it is able to send and receive data in real time to/from the surface (FIG. 1) during operation. The communication lines 214 and/or the communication lines 216 may be any type of wired telecommunications devices or means known to those skilled in the art such as, but not limited to, electric wires or lines, fiber optic lines, etc. Alternatively or additionally, the controller module 212 may include or otherwise be a telemetry module used to transmit measurements to the surface wirelessly, if desired, using one or more downhole telemetry techniques including, but not limited to, mud pulse, acoustic, electromagnetic frequency, combinations thereof, and the like.

Figure 3:
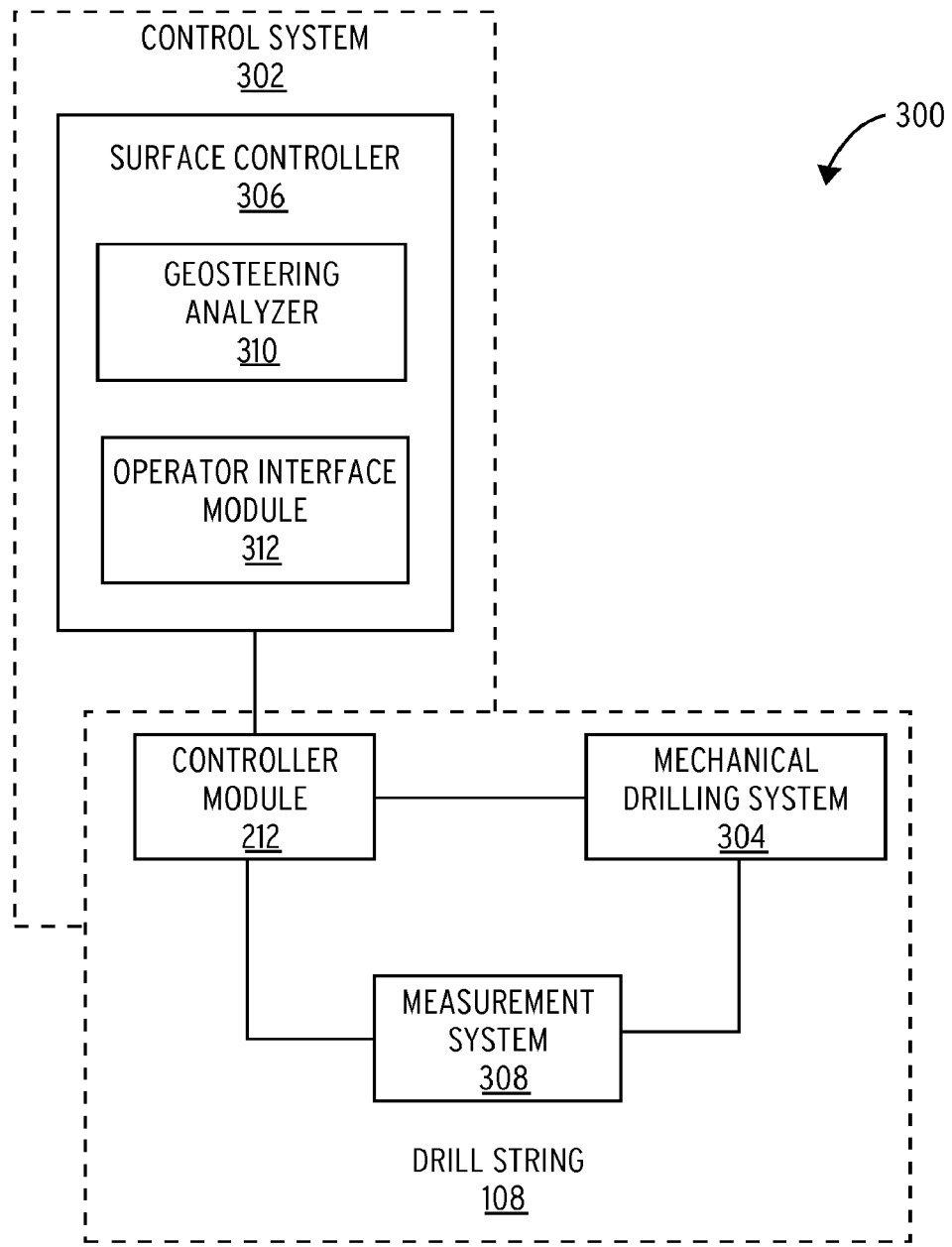
FIG. 3 depicts a simplified schematic diagram of a system that is configured to execute methods of well planning and/or automated drilling control according to an example embodiment.

Referring now to FIG. 3, therein is illustrated a simplified schematic diagram of a drilling system 300 that may be configured to execute the disclosed methods described herein, according to one or more embodiments. As illustrated, the system 300 may include a drill string 108 comprising drill pipe and various drill tools (such as the drill bit 114 and the steering assembly 202) that together provide a mechanical drilling system 304.

The system 300 further includes a control system 302 that comprises the controller module 212, as generally described above with reference to FIG. 2, the controller module 212 being incorporated in the drill string 108. The controller module 212, as generally described above with reference to FIG. 2, is communicably coupled to the mechanical drilling system 304 and to a measurement system 308. The measurement system 308 is in this example embodiment incorporated in the drill string 108 and may include, for example, the measuring tool 204 and the sensor sub 210 (FIG. 2) in order to collect and transmit directional information, mechanical information, formation data, and the like. Updated directional information of the BHA 126 (FIG. 2), such as course length, inclination and azimuth, may be obtained and transmitted in real-time to the controller module 212 in the form of one or more measurement signals. In other embodiments, at least part of the measurement system 308 may be provided separately from the drill string 108. Formation evaluation data may for example in some embodiments be gathered by measurement tools in one or more offset wells.

The control system 302 in this example embodiment further includes a surface controller 306 communicatively coupled to the controller module 212. The surface controller 306 may comprise one or more computer subsystems (such as that described later herein with reference to FIG. 7) that provide a geosteering analyzer 310 and, in this example embodiment, an operator interface module 312. The geosteering analyzer 310 may be configured to perform automated geosteering analysis based at least in part on a wellbore performance model, as described with reference to FIGS. 4-6. The description that follows with respect to automated analyses and calculations for geosteering control, planning, or assistance is to be understood as being performed by the geosteering analyzer 310. In this embodiment, the geosteering analyzer 310 is provided by a plug-in for a geosteering application, thereby specially to configure one or more computer devices forming part of the control system 302 to perform automated operations as described herein. Instead of such temporary configuration of circuitry for, inter alia, automated wellbore performance determination, the geosteering analyzer 310 may in other embodiments be provided by permanently configured circuitry for performing the described operations, for example comprising an application-specific integrated circuit and/or firmware.

The operator interface module 312 is configured to generate one or more user interface on an operator control device to permit display of geosteering information to the operator and/or to receive operator control input. Geosteering signals generated by the geosteering analyzer 310 may include display signals for causing geosteering decision/assistance information to be displayed to the operator. Instead, or in addition, the geosteering signals generated by the geosteering analyzer 310 may include control signal for communication to the steering assembly 202, e.g., via the controller module 212.

An example analytical well performance model that expresses a wellbore production measure (in this example embodiment, a productivity index (PI)) as dependent on wellbore trajectory, as previously discussed broadly, will now be described in further depth with reference to FIGS. 4 and 5.

As will be seen in what follows, the general model described herein can be applied to any well configuration vertical, slanted or horizontal wells. This is at least in part because the well performance model offers more flexibility than prior techniques, in that it accounts for both inclination and azimuth variation along the wellbore. At least in part because of such three-dimensional sensitivity to wellbore trajectory variation, the example well performance model can be applied to complex trajectories generated by geosteering, thus providing for more accurate estimation of the production measure.

This is achieved by dividing the producing a complex well trajectory or part thereof into different segments (which is in this case approximated as straight line segments) and calculating the final productivity of the well by using superposition in space. Unlike existing models, where flow patterns are assumed and well trajectories are simplify into 1D or 2D, the disclose well performance model does not assume any predefined flow patterns or wellbore trajectory, which greatly increases its scope of application for practical engineering problems and permits its use for geosteering purposes.

Generally, geosteering is the process of, during a drilling operation, adjusting the borehole position (e.g., inclination and azimuth angles) on the fly to reach one or more geological targets. A main objective of well placement in geosteering is to place and keep the well in a target zone. When the well trajectory is modified to stay in the target zone, the well position with respect to the reservoir boundaries may change, which can affect the associated production of the well. In this context, production refers to extraction of oil/gas by flow from the reservoir into the wellbore.

A commonly used existing analytical model for productivity estimation in horizontal wells is that proposed by Babu & Odeh in 1989, which assumes the well in a box-shaped reservoir. However, this model is premised on the restriction that the well trajectory be parallel to sides of the drainage area. A further foundational restriction of this prior model is that the sides of the box reservoir are aligned with the principle permeability directions.

Economides later presented a more broad technique to estimate productivity index of horizontal wells. The main downside of this model, however, is that it requires interpolation for shape factors from a table where only certain drainage shapes are given. The model is also fundamentally limited to 2D variation of the well trajectory. Many studies have moreover shown that a horizontal well is never completely horizontal because drilling tools invariably create an undulating effect when geosteering. Yet further, some unconventional reservoirs such as thin-bedded or tight sand reservoirs require high undulation wells in order to penetrate all the isolated layers. Kamkom, Zhu, and Bond, 2007, proposed an analytical 2D line source model which is also unable to account for complex three dimensional trajectories such as that which is the case for most geosteered wells. It will thus be seen that geosteering based on prior productivity models is not feasible.

The well performance model of the present example embodiment provides for a line source model that accounts for both azimuth and inclination variation in the wellbore trajectory. The model is further not based on any relaxation regarding flow pattern assumptions. Complex trajectories can be segmented into separate model straight line segments, followed by superposition to estimate cumulative productive. The proposed model is general and can be applied to any well configuration: horizontal, vertical or multilateral.

Figure 4:
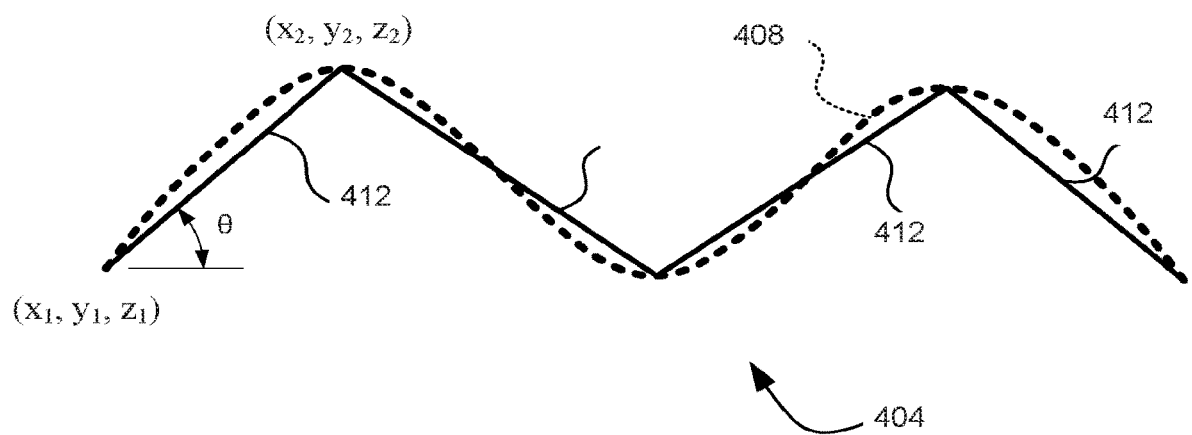
FIG. 4 depicts a schematic elevational view of a three-dimensional well trajectory portion modeled as a series of connected straight line segments.

FIG. 4 shows a two-dimensional schematic elevational view of a productive portion 404 of a wellbore trajectory 408 under consideration, for which a production measure in the form of a productivity index value is to be predicted. The trajectory 408 is in this example that of a horizontally extending undulated well that extends generally in a horizontal x-axis direction in the coordinate system of FIG. 4. As shown schematically in FIG. 4 (which represents a projection of the trajectory 408 in the x-z plane), the position of different points on the trajectory 408 may vary in z-axis coordinates (responsive to drilling at a non-zero inclination θ). The FIG. 4 model of the trajectory 408 also counts, however, for variation of trajectory position in y-axis coordinates (responsive to drilling at a nonzero azimuth angle), i.e., varying in position along an axis normal to the plane of FIG. 4. This complex three dimensional trajectory 408 is simplified by dividing the trajectory portion 404 in a number of trajectory segments 412 located end-to-end along the trajectory 408. Each segment 412 is then simplified as a straight line extending between two points on the trajectory 408, given by respectively by coordinate set $(x_1, y_1, z_1)$ and $(x_2, y_2, z_2)$.

Note different segmentation methods may be used in different embodiments. In some embodiments, the trajectory under consideration may automatically be divided in segments of equal length. In other embodiments, any inflection points within the concert wellbore portion may be identified, with each inflection point serving as a segment endpoint. In FIG. 4, for example, the trajectory 408 defines three inflections or direction changes, which are used to divide the trajectory 408 in four straight line segments 412. Some embodiments may provide for a combination of division in regular lengths and division based on trajectory shape. An extended wellbore portion or an entire productive portion of the wellbore 116 may, for example, be divided into smaller portions of equal length (which may be expressed as depth along the wellbore 116), with the smaller portions then being subdivided to define the individual segments 412 whose productivity index is expressed by the analytical model discussed below.

Figure 5:
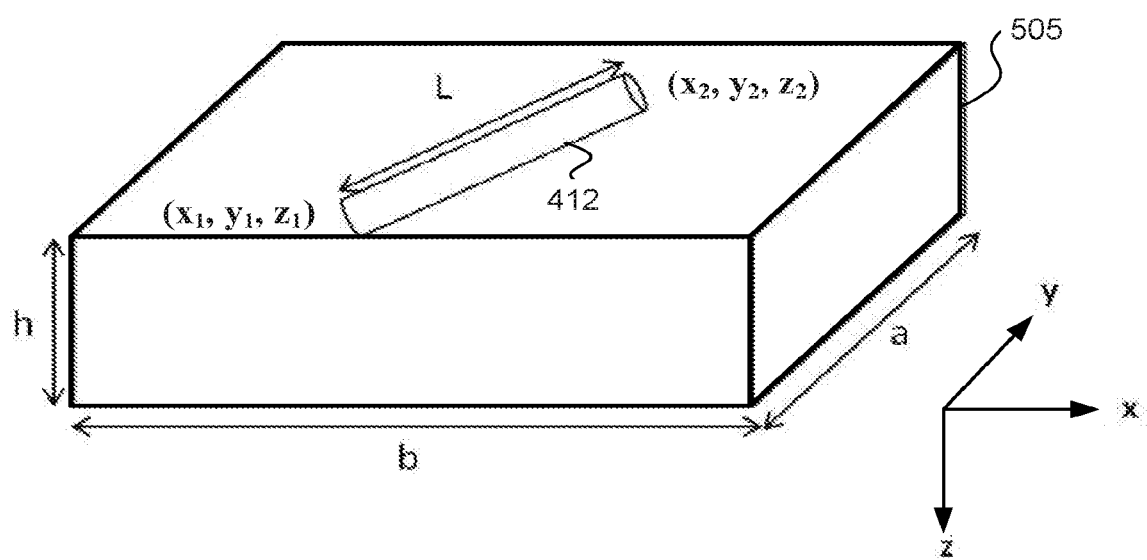
FIG. 5 depicts a reservoir drainage volume for a well trajectory segment approximated as a homogeneous box reservoir within which the segment is located.

As shown schematically in FIG. 5, each straight line segment 412 is modeled as lying within a respective homogenous box reservoir 505. The box reservoir 505 is an approximation of the relevant drainage volume of a correspond part of the formation reservoir. The dimensions of the box reservoir 505, and the coordinates of the segment endpoints relative to the box reservoir 505 are modeled based at least in part on geological logging data and/or survey data from the BHA 126. At least some boundaries of the box reservoir 505 may, for example, approximate corresponding bed boundaries. The diffusivity equation (with which a person skilled in the art will be familiar) is used to solve the flow problem posed by the trajectory segment 412 in the box reservoir 505 in porous media. The instantaneous Green's source functions and Newman's rule is used to obtain an analytical expression (discussed below) for the continuous line source solution of the diffusivity equation for the 3D approximation with a slightly compressible single phase fluid. The Productivity Index (PI) of the well is obtained under stabilized flow, i.e. using a pseudo steady state condition. The drainage volume of the well is approximated as a homogeneous box reservoir with no flow outer boundaries and constant uniform flux and infinite conductance is assumed along the wellbore.

The diffusivity equation which is derived from continuity equation and Darcy's law is used to solve the flow problems in porous media. Since the diffusivity equation is akin to heat conduction equation, source/sink technique can be used to solve the flow in porous media. Gringarten and Ramy derived the instantaneous Green's function in an infinite slab reservoir which can be applied to solve the diffusivity equation. The boundary condition that is used in this model is no-flow outer boundary reservoir and uniform flux into the wellbore. Instantaneous Green's functions can thus be derived in each direction. Instantaneous point source solution can be integrated over time to obtain a continuous point source solution. Modeling the source as a straight line, a final simplified equation of productivity index of a 3-D line source wellbore (or, in this case, wellbore segment 412) is given by:

$$PI = \frac{q}{p_R - p_{wf}} = \frac{\sqrt[3]{k_x k_y k_z} (x_2 - x_1)}{141.2 \mu B (P_X + P_Y + P_Z + P_{XY} + P_{YZ} + P_{XZ} + P_{XYZ})} \quad (1)$$

Where:
$P_R - P_{wf}$ is pressure difference between the formation and the wellbore, psi;
q is oil flow rate, RB/D;
B is formation volume factor, RB/STB;
μ is viscosity, cp;
$k_x$, $k_y$, and $k_z$ are permeability values for the respective coordinate axes, with the term $$\sqrt[3]{k_x k_y k_z}$$

expressing average permeability $\bar{k}$; and
the summation terms in the denominator ($P_X$, $P_Y$, $P_Z$, $P_{XY}$, $P_{YZ}$, $P_{XZ}$, and $P_{XYZ}$) are dimensionless quantities which capture the type of flow happening from the reservoir into the wellbore. Persons familiar with mathematical analysis and modeling of three-dimensional flow problems will be familiar with the relationship between these summation terms and different types of flow represented thereby.

It will be appreciated that the solution of Equation (1) can be used to predict well performance of any wellbore configuration: horizontal, vertical or inclined. Since the diameter of the wellbore is much smaller than the size of the reservoir, the application of line source solution to predict the performance of the well is reasonable. The inner boundary condition that is used for the wellbore is infinite conductance i.e. no pressure drop inside the wellbore. As discussed previously, the model expressed by Equation (1) can be used along with superposition techniques to estimate the performance of complex well trajectories generated by geosteering.

In this instance, the superposition technique described with reference to FIG. 4 is used, and which the wellbore or a portion thereof under consideration is divided into several straight line segments 412. The only input required with respect to well trajectory is the coordinates of the end points of each segment. Equation (1) can be rewritten as follows:

$$PI = \frac{q}{p_R - p_{wf}} = \frac{1}{F} \quad (2)$$

A pressure drop measured at the center of each segment i, due to flow at segment j is given by $$\Delta p_i = q_j F(i,j) \quad (3)$$

Based on the assumption of an infinite conductance wellbore, the pressure drop would be same for all the segments 412. For a system with N segments of, a system of linear equations is given by $$\begin{bmatrix} F(1,1) & \cdots & F(1,N) \\ \vdots & \ddots & \vdots \\ F(N,1) & \cdots & F(N,N) \end{bmatrix} \begin{bmatrix} q_1 \\ \vdots \\ q_N \end{bmatrix} = \begin{bmatrix} \Delta p \\ \vdots \\ \Delta p \end{bmatrix} \quad (4)$$

The final productivity index is then given by $$PI_{final} = \sum_{i=1}^{N} \frac{q_i}{\Delta p} \quad (5)$$

Figure 6:
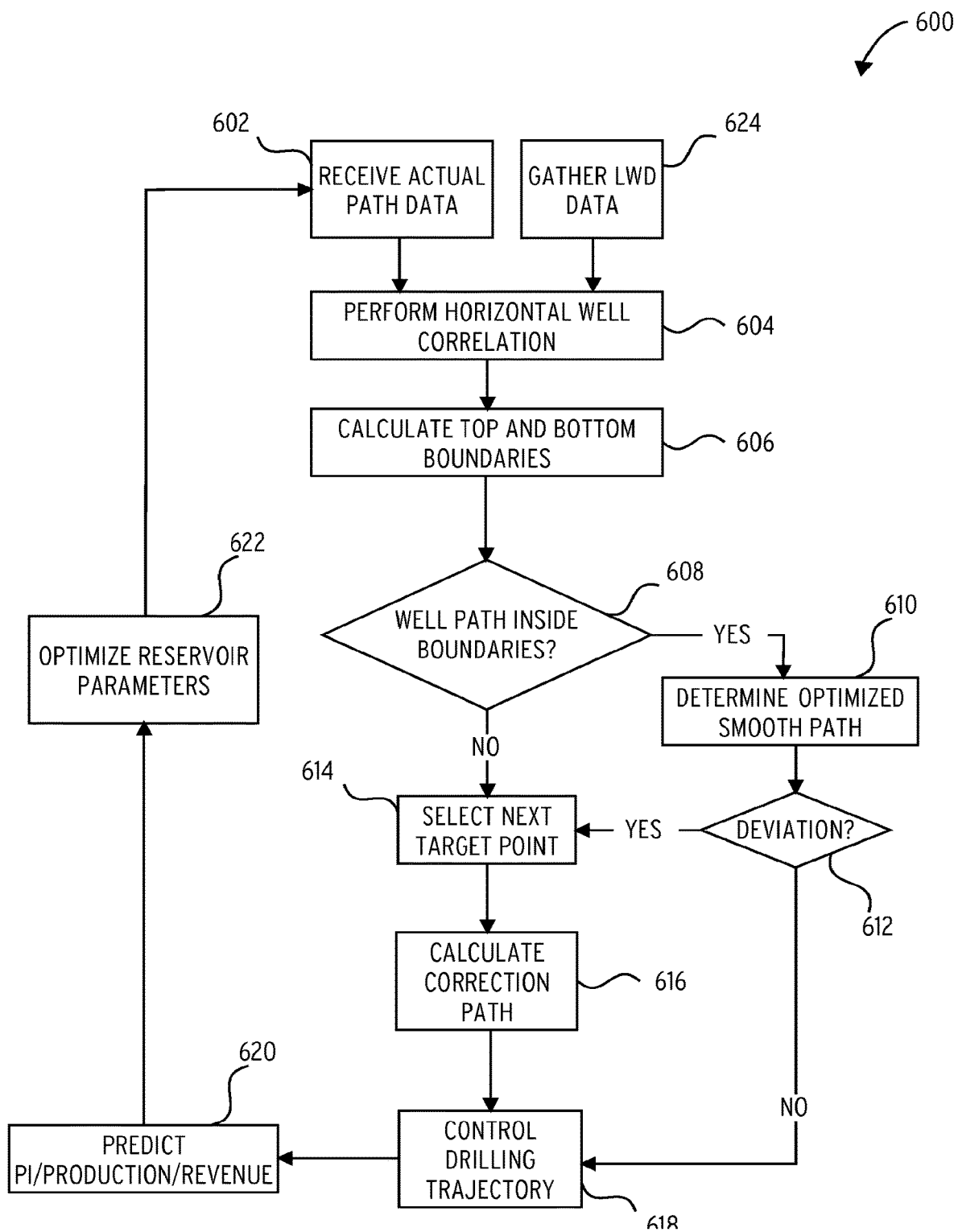
FIG. 6 depicts a schematic flow diagram of a method of automated control of a subterranean drilling operation using real-time log data, according to one example embodiment.

FIG. 6 shows a flowchart of one example embodiment of a method 600 for using automated wellbore performance prediction for geosteering control or assistance. The method 600 is in this example embodiment performed using the well production model described above with reference to FIGS. 4 and 5, as expressed by Equations (1) and (5). The example method 600 may be implemented using the example drilling system 300 and components described with reference to FIGS. 1-3.

In this example embodiment, the method 600 is described with reference to the drilling of an undulated wellbore 116 that extends more or less horizontally in a formation 118 defined between generally horizontal bed boundaries. It will be appreciated, however, the methods and systems described herein can in other embodiments be employed in the drilling of wells of any suitable kind or orientation.

At operation 624, the control system 302 receives and processes measurement signals gathered by the sensor sub 210 and indicating, inter alia, actual path data representing an actual path described by the BHA 126 in drilling the wellbore 116. The controller module 212 may include a processing unit that may be configured to receive and process the measurement signals. In some embodiments, the processing unit may be a proportional-integral-derivative (PID) controller module or system. As drilling progresses and advances within the subterranean formation 118 (FIG. 1), the measurement system 308 may be configured to continually take or otherwise obtain survey measurements corresponding to the real-time conditions of the drilling operation. In some embodiments, the survey measurements may be taken at specific survey points, but may equally be taken at any time during the drilling operation, without departing from the scope of the disclosure. Accordingly, as the drilling operation progresses, the controller module 212 is continually updated with real-time measurement data corresponding to directional information (i.e., real-time inclination and azimuth angles) of the BHA 126 (FIG. 2) and can then issue corrective command signals configured to maintain the actual wellbore path in-line with the planned wellbore path, as discussed below.

At operation 602, logging data indicative of one or more formation property metrics, as discussed previously, are continuously gathered by the measuring tool 204 forming part of the BHA 126. The LWD logging data may include, as mentioned previously, sonic logs, neutron density logs, gamma ray logs, resistivity logs, or the like.

At operation 604, horizontal well correlation is performed using the LWD and MWD data gathered by the BHA 126 together with logging data gathered in one or more offset wells, thereby to dynamically update a geological model and structural framework on which the geosteering operation is based. Thereafter, top and bottom boundaries of a target zone within the formation 118 is automatically calculated, at operation 606. At operation 608, the control system 302 automatically determines whether or not the current position and projected position of BHA 126 is within the boundaries of the target zone.

If, at operation 608, it is determined that the well path is within the target zone boundaries, an optimized path or trajectory is determined, at operation 610, which then becomes the planned or target trajectory for the wellbore 116.

In this example embodiment, well path optimization, at operation 610, is based at least in part on automated well performance calculations using the well performance model as described. In some embodiments, the well path or trajectory optimization comprises identification of a target trajectory with a maximum PI value returned by the well performance model of Equations (1) and (5). The well path optimization of operations 610 in some embodiments comprise identifying a number of alternative for candidate trajectories, calculating a respective productivity index value for each candidate trajectory, and then selecting as optimized path the candidate trajectory having the highest productivity index. Similar calculations may be performed to calculate additional or alternative production measures, such as total projected production of a wellbore having the respective trajectory, predicted revenue for the wellbore trajectory (estimated for a predefined future period such as, say, 5 years), or a net present value of a wellbore having the particular considered trajectory. In other embodiments, a target trajectory may, instead of automated selection, be selected by an operator responsive to presentation of a number of alternative trajectories together with one or more respective production measure values.

In this example embodiment, however, well path optimization is based not only on productivity measure values calculated by use of the well performance model, but is additionally based a drilling efficiency measure expressed as a function of one or more drillbore trajectory parameters or attributes. The present example embodiment provides for determination of the target trajectory based on automated determination of wellbore profile energy using the techniques described in International Application PCT/US2013/057498, filed Aug. 30, 2013, titled "Automating Downhole Drilling Using wellbore Profile Energy and Shape," and published as WO/2015/030790. Note that other example embodiments may provide for use of a different drilling efficiency model, and/or may include one or more additional trajectory-sensitive measures whose automatically calculated values for different trajectories may inform target trajectory selection.

In this embodiment, optimized path or target trajectory determination, at operation 610, comprises, for each of a number of alternative candidate trajectories, calculating respective well productivity index values and well profile energy values for the respective alternative trajectories. A particular trajectory may then be selected based on the respective calculated values. Such trajectory selection can in some instances be performed automatically, e.g. by the geosteering analyzer based on selecting an optimum alternative based on a predefined composite metric that includes both the calculated well production value and the well profile energy value. In other instances, the geosteering analyzer 310 may cause display to the operator of the respectively calculated values for the alternative trajectories, to enable operator selection of a target trajectory informed by both of these measure.

Instead, or in combination, separate trajectories optimized for well profile energy and for well productivity, respectively, can in some embodiments be determined separately, and is then combined for automated trajectory selection or is displayed in combination for assisting operator-controlled wellpath selection.

Wellbore profile energy quantifies the complexity of the well trajectory based on mathematical modeling. Differently worded, the well profile energy represents smoothness of a trajectory, with a perfectly rectilinear trajectory having a zero value well profile energy. The WPE model used in this example is:

$$E_s = \int_0^l (\kappa(x)^2 + \tau(x)^2) dx \quad (6)$$

Where:
k is curvature of the wellbore trajectory $$\left(\frac{\Delta \alpha}{\Delta x}\right),$$

distance is normalized to 100 ft, and τ is torsion of the wellbore trajectory.

As is often the case, however, the tool string may deviate from the original designed wellbore path and/or from the target path and instead an actual wellbore path may result that is misaligned with or otherwise diverges from the original well bore path. Such deviations may result from several indirect variables such as, but not limited to, the rate of penetration of the tool string, the deflection of the tool string within varying rock types and/or formations, the toolface setting, rotation of the tool string (i.e., sliding or rotary, depending on the type of drilling motor), the wearing out of the drill bit 114 and other tools in the BHA 126, vibration in the drill string 108, combinations thereof, and the like. The control system 302 therefore determines, at operation 612, whether or not the well path has deviated from the optimized smooth path. If not, the method 600 proceeds to operation 618, the BHA 126 is steered along the target trajectory by use of the steering assembly of the BHA 126. If, however, determination at operation 612 indicates that the well path has deviated from the planned optimized path, a next target point along the planned well path is selected, at operation 614.

Returning now to operation 608, if it is determined that the well path is outside of the boundaries of the target zone, a next target point for returning to the planned well path is likewise selected, at operation 614. After selection of the next target point, at operation 614, a correction path for returning to the planned well path is calculated, at operation 616. A person skilled in the art will appreciate that there are several methods of redirecting the tool string to the planned path, this example embodiment again uses a trajectory control model that does so based on a minimum wellbore energy criterion in order to minimize overshoots and undulations of well trajectories, as described and detailed in the above-mentioned International Application WO/2015/030790. In some embodiments, the calculation of the correction path, at operation 616, may instead or in addition be performed based at least in part on automated wellbore performance prediction, similar to that described with reference to operation 610.

At operation 620, automated wellbore performance prediction is performed with respect to the current well path trajectory. This operation may thus return production measure such as a production index value, a production value, and/or a revenue value based wellbore trajectory currently being traced by control of the drilling trajectory at 618. Such current estimation production measures may be presented on the fly to the operator at the surface. In this example embodiment, one or more of the predicted values for the current trajectory is displayed on a drilling control panel or interface to the operator together with corresponding performance values for an optimized path and/or the planned well path according to the previously determined target trajectory. Such realtime display of comparative production measure values enables the operator to steer the BHA 126 such as to produce a wellbore 116 that is more productive than would otherwise be the case.

At operation 622, reservoir parameters is optimized. This may comprise updating of the geological model for the reservoir based on the latest LWD data gathered by the drill tool. The cycle of operations represented by the method 600 may be repeated substantially continuously during the drilling operation, or may be performed at predefined time or depth intervals.

Based on the foregoing description, it will be recognized that the example techniques present a number of benefits over existing analogous methods. Productivity is improved by avoiding drilling out of the pay zone, by keeping the wellbore 116 and a substantially constant distance from a reservoir boundary or fluid contact, and by placing the well optimally within the reservoir. Well productivity is further promoted by reducing the need for sidetracks by keeping more of the well within the target zone and by maximizing exposure of the wellbore to the target zone. The method 600 of FIG. 6 also provides allows scanning of a better understanding of the surrounding geology, and increasing rate of penetration due to increased understanding of the surrounding reservoir structure.

Provision of on the fly well productivity predictions result better geosteering decisions, achieving improved well placement. These benefits are exacerbated by promotion of the identification of good quality reservoirs and by real-time visualization of the well position. All of these factors contribute to providing for reduced drilling costs and increased well production.

Note that these benefits associated with real-time performance prediction and production optimization are enabled by use of the described analytical models, which permit sufficiently fast computation to be used in real-time geosteering.

COMPONENTS, AND LOGIC OF EXAMPLE EMBODIMENTS

Certain embodiments are described herein as including logic or a number of components, modules, mechanisms, computer processor devices or other hardware components configured to perform specified automated tasks, processes or operations. Such components comprise hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein. Logic circuitry of the processor is in such cases temporarily configured by the software executed thereon to perform specific task. As is well known to persons knowledgeable in the field, execution of a software program by a reconfigurable processor physically reconfigures the processor to provide for circuitry that is specially configured to perform particular non-generic tasks.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry or in temporarily configured circuitry (e.g., configured by software), may be driven by cost and time considerations.

Accordingly, the terms hardware-implemented module, circuitry configured to perform specified tasks, or a computer processor device configured to perform certain tasks should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which such hardware-implemented components are temporarily configured (e.g., programmed), each of the hardware-implemented components/modules need not be configured or instantiated at any one instance in time. For example, where the hardware-implemented components comprise a processor temporarily configured using software, the processor may be configured as respective different hardware-implemented components at different times. Software may accordingly configure a processor, for example, to constitute a particular hardware-implemented module, device, or component at one instance of time and to constitute a different hardware-implemented module, device, or component at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Figure 7:
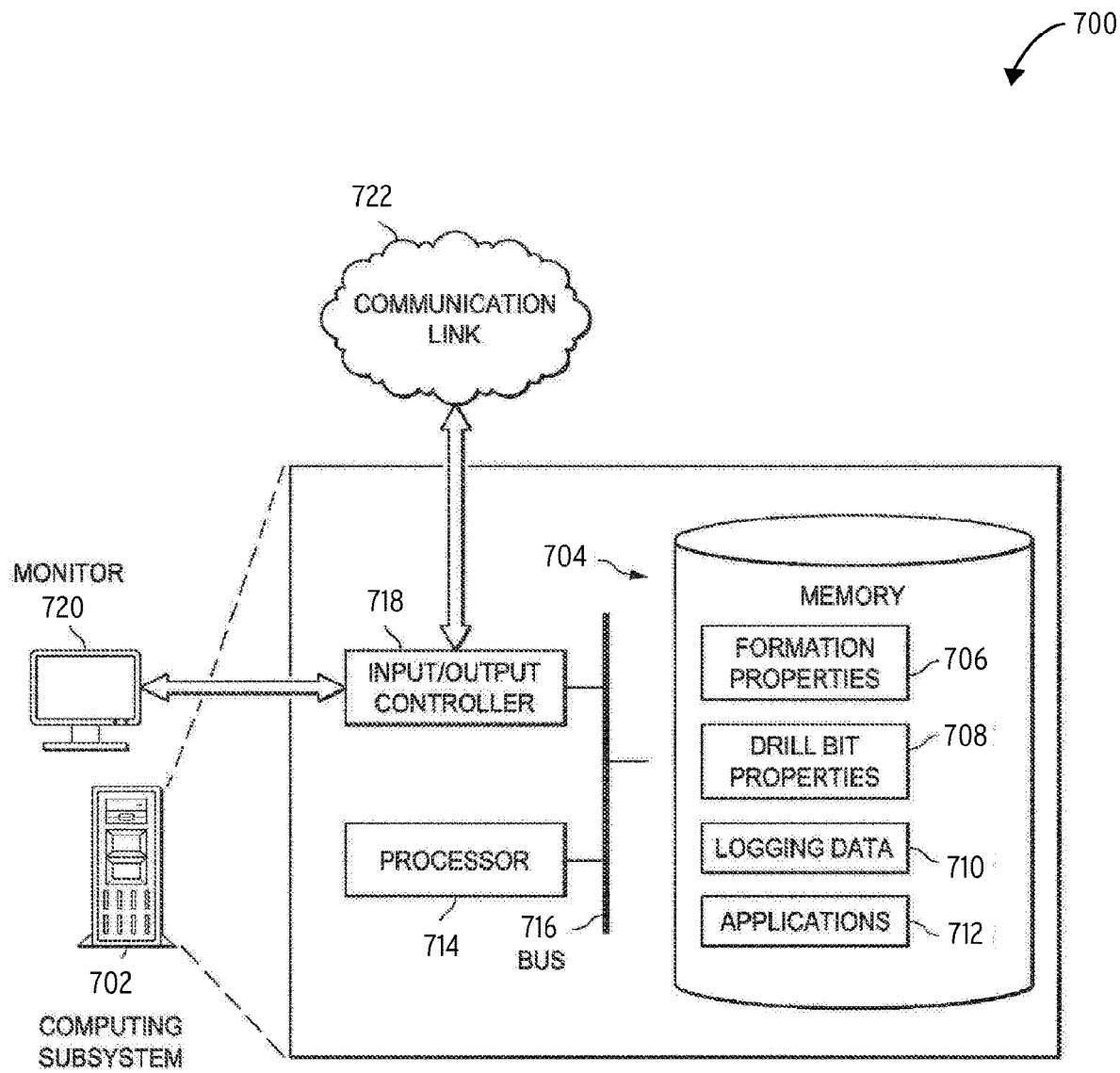
FIG. 7 diagrammatically depicts an exemplary computer subsystem forming part of a system for planning and/or control of a drilling operation, in accordance with one example embodiment.

FIG. 7 illustrates an exemplary control system 700 for controlling operation of the drill string 108, the control system 700 including a computing subsystem 702 according to one example embodiment. Computing subsystem 702 may be located at or near one or more well bores of drilling system 100 or at a remote location. All or part of computing subsystem 702 may operate as a component of or independent of drilling system 100 or independent of any other components shown in FIG. 1 and FIG. 2.

Computing subsystem 702 includes a memory 704, a processor 714, and input/output controllers 718 communicatively coupled by a communication bus 716. Processor 714 may include hardware for executing instructions, such as those making up a computer program, such as applications 712. As an example and not by way of limitation, to execute instructions, processor 714 may retrieve (or fetch) the instructions from an internal register, an internal cache, and/or memory 704; decode and execute them; and then write one or more results to an internal register, an internal cache, and/or memory 704. This disclosure contemplates processor 714 including any suitable number of any suitable internal registers, where appropriate. Where appropriate, processor 714 may include one or more arithmetic logic units (ALUs); be a multi-core processor; or include one or more processors. Although this disclosure describes and illustrates a particular processor, this disclosure contemplates any suitable processor. In some embodiments, processor 714 may execute instructions, for example, to generate output data based on data inputs. For example, processor 714 may run applications 712 by executing or interpreting software, scripts, programs, functions, executables, or other modules contained in applications 712.

The processor 714 thus provides, in this example embodiment, circuitry which is temporarily configured to perform automated control and/or optimization operations as described. Instead or in addition, one or more processors or computing modules of the control system 700 may be provided by permanently configured circuitry, such as hard-wired computing components and application-specific integrated circuits (ASICs) specifically configured to performed one or more of the automated optimization and/or control methodologies described herein without execution.

Processor 714 may perform one or more operations related to FIGS. 4-6. Input data received by processor 714 or output data generated by processor 714 may include formation properties 706, drill bit properties 708, and logging data 710. Memory 704 may include, for example, random access memory (RAM), a storage device (e.g., a writable read-only memory (ROM) or others), a hard disk, a solid state storage device, or another type of storage medium. Computing subsystem 702 may be preprogrammed or it may be programmed (and reprogrammed) by loading a program from another source (e.g., from a CD-ROM, from another computer device through a data network, or in another manner). In some embodiments, input/output controllers 718 may be coupled to input/output devices (e.g., monito20, a mouse, a keyboard, or other input/output devices) and to communication link 280. The input/output devices may receive and transmit data in analog or digital form over communication link 280. Memory 704 may store instructions (e.g., computer code) associated with an operating system, computer applications, and other resources. Memory 704 may also store application data and data objects that may be interpreted by one or more applications or virtual machines running on computing subsystem 702. For example, formation properties 706, drill bit properties 252, logging data 710, and applications 712 may be stored in memory 704. In some implementations, a memory of a computing device may include additional or different data, applications, models, or other information. Formation properties 706 may include information that may be used to determine the properties of the formation (e.g., the volume percentage of shale and sandstone, gamma ray readings, confined rock strengths, and/or unconfined rock strength). Drill bit properties 252 may include information that may provide information about the drill bit (e.g., the diameter of a drill bit, the diameter of a cutting element, the volume of the cutting element, the placement of the cutting element on the drill bit, rock-drill bit interaction constant, and/or bit wear coefficients). Logging data 710 may include information on the logging performed in subterranean region 104 (e.g., gamma ray readings performed in the wellbore). Values from formation properties 706, drill bit properties 708, and logging data 710 may be used to calculate the wear of a cutting element on a drill bit. Applications 712 may include software applications, scripts, programs, functions, executables, or other modules that may be interpreted or executed by processor 714. Applications 712 may include machine-readable instructions for performing one or more operations described herein. Applications 712 may include machine-readable instructions for optimizing ROP and/or energy of the drilling operation based on realtime formation property measurements that include one or more rock brittleness correlate. Applications 712 may generate output data and store output data in memory 704, in another local medium, or in one or more remote devices (e.g., by sending output data via communication link 722). Communication link 280 may include any type of communication channel, connector, data communication network, or other link. For example, communication link 722 may include a wireless or a wired network, a Local Area Network (LAN), a Wide Area Network (WAN), a private network, a public network (such as the Internet), a wireless network, a network that includes a satellite link, a serial link, a wireless link (e.g., infrared, radio frequency, or others), a parallel link, or another type of data communication network. Generally, the techniques described here may be performed at any time, for example, before, during, or after a subterranean operation or other event. In some instances, the techniques described may be implemented in real time, for example, during a drilling operation. Additionally, computing subsystem 702 may be located on the surface of the wellbore or may be located downhole as part of a downhole tool or BHA 126.

The following numbered examples are illustrative embodiments in accordance with various aspects of the present disclosure, at least some of which are exemplified by the foregoing description of a detailed example embodiment.

1. A system may comprise:

one or more memory devices storing formation data indicating one or more attributes of an underground formation in which a wellbore is to be drilled to produce reservoir fluids by flow thereof from the formation into the wellbore;

a geosteering analyzer one or more computer processor devices configured automatically to determine target trajectory information for the wellbore based at least in part on the formation data and based at least in part on a well performance model that expresses a wellbore production measure for at least a wellbore segment such that the wellbore production measure is variable with variation in a corresponding wellbore trajectory; and a controller configured to generate and transmit a geosteering signal indicating a set of trajectory values based on the target trajectory information, to enable steering of a drill tool in the formation based at least in part on the target trajectory information.

In some embodiments, the set of trajectory values represented by the geosteering signal may indicate respective values for the wellbore production measure associated with one or more wellbore trajectories. Instead, or in addition, the set of trajectory values may indicate a target trajectory that is to be followed in the drilling operation. It will thus be seen that the geosteering signal set of trajectory values may be information of any kind that is derived based on automated modeling of well performance using the model, and that pertains to the trajectory for the drill tool during drilling.

2. A system according to example 1, wherein the geosteering analyzer is configured such that the well performance model accounts for variations both in inclination and in azimuth angle. Quantification of the wellbore production measure for a trajectory segment in the formation may thus be variable in response both to variation of inclination of the trajectory segment and in response to variation of azimuth angle of the trajectory segment.

3. A system according to any one of examples 1 or 2, wherein the geosteering analyzer is configured such that the well performance model accounts for a complex three dimensional trajectory that defines at least one inflection point and that comprises a plurality of trajectory segments for which no plane can be defined that contains each of the plurality of trajectory segments.

4. A system according to any one of the preceding examples, wherein the geosteering analyzer is configured to calculate the wellbore production measure for a portion of a subject trajectory by automatically performing operations comprising:
(a) dividing the trajectory portion into a plurality of trajectory segments located end-to-end;
(b) calculating a respective production measure value for each of the plurality of trajectory segments; and
(c) combining the wellbore production measure values of the plurality of trajectory segments to determine a cumulative production measure value for the portion of the subject trajectory.

5. A system according to example 4, wherein the geosteering analyzer is configured to calculate the respective production measure value for each trajectory segment based on modeling the trajectory segment as a straight line lying within a homogenous box reservoir with no-flow outer boundaries, the box reservoir approximating the formation based at least in part on the formation data.

6. A system according to example 4, wherein the geosteering analyzer is configured such that the well performance model assumes constant uniform flow within each box reservoir, without restriction of flow to any predefined flow pattern.

7. A system according to any one of the preceding examples, wherein the wellbore production measure expressed by the well performance model is a productivity index that indicates an estimated volume of reservoir fluids producible by a wellbore or wellbore portion per unit of pressure difference between a wellbore fluid pressure and a formation fluid pressure.

8. A system according to example 7, wherein the geosteering analyzer is configured such that the production model expresses the productivity index as $$\frac{\sqrt[3]{k_x k_y k_z}\,(x_2 - x_1)}{141.2\mu B(P_X + P_Y + P_Z + P_{XY} + P_{YZ} + P_{XZ} + P_{XYZ})}$$

where:
$k_x$, $k_y$, and $k_z$ are mutually orthogonal horizontal and vertical permeabilities;
$\mu$ is fluid viscosity;
$x_2$ and $x_1$ are x-axis coordinates of the straight line representing the trajectory segment under consideration;
B is a formation volume factor, Reservoir Barrel/Stock Tank Barrel; and
denominator summation terms ($P_X+P_Y+P_Z+P_{XY}+P_{YZ}+P_{XZ}+P_{XYZ}$) are dimensionless quantities capturing a type of flow from the reservoir into the wellbore.

9. A system according to any one of examples 1-6, wherein the wellbore production measure is selected from the group comprising: net present value of the wellbore, and predicted revenue of the wellbore.

10. A system according to any one of the preceding examples, wherein the geosteering analyzer is configured to determine a target trajectory based at least in part on performing an automated optimization for the wellbore production measure based on the well performance model with respect to a plurality of alternative candidate wellbore trajectories.

11. A system according to any one of the present claims, wherein the geosteering analyzer is further configured to determine the target trajectory information based at least in part on an analytical drilling efficiency model that expresses a drilling efficiency measure as dependent on one or more wellbore trajectory attributes. In one embodiment of example 11, the drilling efficiency model expresses well profile energy of a particular trajectory.

12. A system according to any one of the preceding claims, wherein the geosteering analyzer is configured to determine the target trajectory information substantially in real time during a drilling operation, the formation data being log data captured by the drill tool performing the drilling operation.

13. A system according to any one of the preceding examples, wherein the controller is configured such that the geosteering signal is a display signal to cause display on an operator display device of a graphical representation of at least part of the target trajectory information.

14. A system according to any one of examples 1-12, wherein the controller is configured such that the geosteering signal is a control signal transmitted to the drill tool for controlling steering of the drill tool.

15. A method comprising:
obtaining formation data indicating one or more attributes captured for an underground formation in which a wellbore is to be drilled to produce reservoir fluids by flow thereof from the formation into the wellbore;
in an automated operation based at least in part on the formation data and performed using one or more computer processor devices configured to perform the automated operation, determining target trajectory information for the wellbore based at least in part on a well performance model that expresses a wellbore production measure for at least a wellbore segment such that the wellbore production measure is variable with variation in a corresponding wellbore trajectory; and
generating and transmitting a geosteering signal indicating a set of trajectory values based on the target trajectory information, to enable steering of a drill tool in the formation based at least in part on the target trajectory information.

16. A method according to example 15, wherein the well performance model accounts for variations both in inclination and in azimuth angle, so that quantification of the wellbore production measure for a trajectory segment in the formation is variable in response to variation of inclination of the trajectory segment and in response to variation of azimuth angle of the trajectory segment.

17. A method according to example 15 for example 16, wherein the determining of the target trajectory information comprises:
dividing a trajectory under consideration into a plurality of trajectory segments located end-to-end;
for each trajectory segment, modeling the segment as a extending through a respective homogenous box reservoir approximating the reservoir based at least in part on the formation data;
for each trajectory segment, calculating a respective production measure value pertaining to drainage from the associated box reservoir into the trajectory segment; and
combining the wellbore production measure values of the plurality of trajectory segments to determine a cumulative production measure value for the trajectory under consideration.

18. A method according to any one of examples 15-17, wherein the wellbore production measure expressed by the well performance model is a productivity index that indicates an estimated volume of reservoir fluid producible by a particular wellbore trajectory per unit of pressure difference between a wellbore fluid pressure and a formation fluid pressure.

19. A method according to any one of examples 15-18, wherein determining the target trajectory information is additionally based at least in part on analytical drilling efficiency model that expresses a drilling efficiency measure as being dependent on one or more wellbore trajectory attributes.

20. A method according to example 15, further comprising performance of respective operations corresponding to the features of system configuration according to any one of examples 2-15.

21. A non-transitory computer readable storage medium having stored thereon instructions for causing a machine, in response to executing instructions, to perform operations comprising:

accessing formation data indicating one or more attributes captured for an underground formation in which a wellbore is to be drilled to produce reservoir fluids by flow thereof from the formation into the wellbore;

in an automated operation based at least in part on the formation data and performed using one or more computer processor devices configured to perform the automated operation, determining target trajectory information for the wellbore based at least in part on a well performance model that expresses a wellbore production measure for at least a wellbore segment such that the wellbore production measure is variable with variation in a corresponding wellbore trajectory; and generating a geosteering signal indicating a set of trajectory values based on the target trajectory information, to enable steering of a drill tool in the formation based at least in part on the target trajectory information.

22. A non-transitory computer readable storage medium according to example 21, wherein the instructions is for causing a machine to perform operations corresponding to the features of system configuration according to any one of examples 2-15.

Although specific examples have been illustrated and described herein, it will be appreciated by those of ordinary skill in the art that any arrangement that is calculated to achieve the same purpose may be substituted for the specific examples shown. Various examples use permutations and/or combinations of examples described herein. It is to be understood that the above description is intended to be illustrative, and not restrictive, and that the phraseology or terminology employed herein is for the purpose of description. Combinations of the above examples and other examples will be apparent to those of skill in the art upon studying the above description.

What is claimed is:

1. A system comprising:
one or more memory devices storing formation data indicating one or more attributes of an underground formation in which a wellbore is to be drilled to produce reservoir fluids by flow thereof from the formation into the wellbore;
a geosteering analyzer composing one or more computer processor devices configured automatically to determine target trajectory information for the wellbore based at least in part on the formation data and based at least in part on a well performance model that expresses a wellbore production measure for at least a wellbore segment such that the wellbore production measure is variable with variation in a corresponding wellbore trajectory, wherein the wellbore production measure expressed by the well performance model is a productivity index that indicates an estimated volume of reservoir fluids producible by a wellbore or wellbore portion per unit of pressure difference between a wellbore fluid pressure and a formation fluid pressure, and wherein the geosteering analyzer is configured such that the well performance model expresses the productivity index as $$\frac{\sqrt[3]{k_x k_y k_z}\,(x_2 - x_1)}{141.2\mu B(P_X + P_Y + P_Z + P_{XY} + P_{YZ} + P_{XZ} + P_{XYZ})}$$

where:
$k_x$, $k_y$, and $k_z$, are mutually orthogonal horizontal and vertical permeabilities;
$\mu$ is fluid viscosity;
$x_2$ $x_1$ are x-axis coordinates of the straight line representing the trajectory segment under consideration;
B is a formation volume factor, Reservoir Barrel/Stock Tank Barrel; and
denominator summation terms are dimensionless quantities capturing a type of flow from the reservoir into the wellbore; and
a controller configured to generate and transmit a geosteering signal indicating a set of trajectory values based on the target trajectory information, to enable steering of a drill tool in the formation based at least in part on the target trajectory information.

2. The system of claim 1, wherein the geosteering analyzer is configured such that the well performance model accounts for variations both in inclination and in azimuth angle, so that quantification of the wellbore production measure for a trajectory segment in the formation is variable in response both to variation of inclination of the trajectory segment and in response to variation of azimuth angle of the trajectory segment.

3. The system of claim 2, wherein the geosteering analyzer is configured such that the well performance model accounts for a complex three dimensional trajectory that defines at least one inflection point and that comprises a plurality of trajectory segments for which no plane can be defined that contains each of the plurality of trajectory segments.

4. The system of claim 2, wherein the geosteering analyzer is configured to calculate the wellbore production measure for a portion of a subject trajectory by automatically performing operations comprising:
dividing the trajectory portion into a plurality of trajectory segments located end-to-end;
calculating a respective production measure value for each of the plurality of trajectory segments; and
combining the wellbore production measure values of the plurality of trajectory segments to determine a cumulative production measure value for the portion of the subject trajectory.

5. The system of claim 4, wherein the geosteering analyzer is configured to calculate the respective production measure value for each trajectory segment based on modeling the trajectory segment as a straight line lying within a homogenous box reservoir with no-flow outer boundaries, the box reservoir approximating the formation based at least in part on the formation data.

6. The system of claim 5, wherein the geosteering analyzer is configured such that the well performance model assumes constant uniform flow within each box reservoir, without restriction of flow to any predefined flow pattern.

7. The system of claim 1, wherein the wellbore production measure further comprises at least one of a net present value of the wellbore, and predicted revenue of the wellbore.

8. The system of claim 1, wherein the geosteering analyzer is configured to determine a target trajectory based at least in part on performing an automated optimization for the wellbore production measure based on the well performance model with respect to a plurality of alternative candidate wellbore trajectories.

9. The system of claim 8, wherein the geosteering analyzer is further configured to determine the target trajectory based at least in part on an analytical drilling efficiency model that expresses a drilling efficiency measure as dependent on one or more wellbore trajectory attributes.

10. The system of claim 1, wherein the geosteering analyzer is configured to determine the target trajectory information substantially in real time during a drilling operation, the formation data being log data captured by the drill tool performing the drilling operation.

11. The system of claim 1, wherein the controller is configured such that the geosteering signal is a display signal to cause display on an operator display device of a graphical representation of at least part of the target trajectory information.

12. The system of claim 1, wherein the controller is configured such that the geosteering signal is a control signal transmitted to the drill tool for controlling steering of the drill tool.

13. A method comprising:
obtaining formation data indicating one or more attributes captured for an underground formation in which a wellbore is to be drilled to produce reservoir fluids by flow thereof from the formation into the wellbore;
in an automated operation based at least in part on the formation data and performed using one or more computer processor devices configured to perform the automated operation, determining target trajectory information for the wellbore based at least in part on a well performance model that expresses a wellbore production measure for at least a wellbore segment such that the wellbore production measure is variable with variation in a corresponding wellbore trajectory, wherein the wellbore production measure expressed by the well performance model is a productivity index that indicates an estimated volume of reservoir fluids producible by a wellbore or wellbore portion per unit of pressure difference between a wellbore fluid pressure and a formation fluid pressure, and wherein the geosteering analyzer is configured such that the well performance model expresses the productivity index as $$\frac{\sqrt[3]{k_x k_y k_z}\,(x_2 - x_1)}{141.2\mu B(P_X + P_Y + P_Z + P_{XY} + P_{YZ} + P_{XZ} + P_{XYZ})}$$

where:
$k_x, k_y,$ and $k_z$ are mutually orthogonal horizontal and vertical permeabilities;
$\mu$ is fluid viscosity;
$x_2$ and $x_1$ are x-axis coordinates of the straight line representing the trajectory segment under consideration;
B is a formation volume factor, Reservoir Barrel/Stock Tank Barrel; and denominator summation terms are dimensionless quantities capturing a type of flow from the reservoir into the wellbore; and
generating and transmitting a geosteering signal indicating a set of trajectory values based on the target trajectory information, to enable steering of a drill tool in the formation based at least in part on the target trajectory information.

14. The method of claim 13, wherein the well performance model accounts for variations both in inclination and in azimuth angle, so that quantification of the wellbore production measure for a trajectory segment in the formation is variable in response both to variation of inclination of the trajectory segment and in response to variation of azimuth angle of the trajectory segment.

15. The method of claim 14, wherein the determining of the target trajectory information comprises:
dividing a trajectory under consideration into a plurality of trajectory segments located end-to-end;
for each trajectory segment, modeling the segment as a extending through a respective homogenous box reservoir approximating the reservoir based at least in part on the formation data;
for each trajectory segment, calculating a respective production measure value pertaining to drainage from the associated box reservoir into the trajectory segment; and
combining the wellbore production measure values of the plurality of trajectory segments to determine a cumulative production measure value for the trajectory under consideration.

16. The method of claim 13, wherein the wellbore production measure expressed by the well performance model is a productivity index that indicates an estimated volume of reservoir fluid producible by a particular wellbore trajectory per unit of pressure difference between a wellbore fluid pressure and a formation fluid pressure.

17. The method of claim 13, wherein determining the target trajectory information is additionally based at least in part on analytical drilling efficiency model that expresses a drilling efficiency measure as being dependent on one or more wellbore trajectory attributes.

18. A non-transitory computer readable storage medium having stored thereon instructions for causing a machine, in response to executing instructions, to perform operations comprising:
accessing formation data indicating one or more attributes captured for an underground formation in which a wellbore is to be drilled to produce reservoir fluids by flow thereof from the formation into the wellbore;
in an automated operation based at least in part on the formation data and performed using one or more computer processor devices configured to perform the automated operation, determining target trajectory information for the wellbore based at least in part on a well performance model that expresses a wellbore production measure for at least a wellbore segment such that the wellbore production measure is variable with variation in a corresponding wellbore trajectory, wherein the wellbore production measure expressed by the well performance model is a productivity index that indicates an estimated volume of reservoir fluids producible by a wellbore or wellbore portion per unit of pressure difference between a wellbore fluid pressure and a formation fluid pressure, and wherein the geosteering analyzer is configured such that the well performance model expresses the productivity index as $$\frac{\sqrt[3]{k_x k_y k_z}\,(x_2 - x_1)}{141.2 \mu B (P_X + P_Y + P_Z + P_{XY} + P_{YZ} + P_{XZ} + P_{XYZ})}$$

where:
- $k_x, k_y$, and $k_z$ are mutually orthogonal horizontal and vertical permeabilities;
- $\mu$ is fluid viscosity;
- $x_2$, and $x_1$ are x-axis coordinates of the straight line representing the trajectory segment under consideration;
- B is a formation volume factor, Reservoir Barrel/Stock Tank Barrel; and
- denominator summation terms are dimensionless quantities capturing a type of flow from the reservoir into the wellbore; and generating and transmitting a geosteering signal indicating a set of trajectory values based on the target trajectory information, to enable steering of a drill tool in the formation based at least in part on the target trajectory information.

\* \* \* \* \*